United States Patent [19]

Britto

[11] Patent Number: 4,946,084

[45] Date of Patent: Aug. 7, 1990

[54] SPARE TIRE SUPPORT FOR VEHICLE

[76] Inventor: John H. Britto, 1219 38th St., Sarasota, Fla. 34234

[21] Appl. No.: 398,720

[22] Filed: Aug. 25, 1989

[51] Int. Cl.$^5$ .............................................. B62D 43/00
[52] U.S. Cl. ................ 224/42.21; 224/42.28; 224/42.26; 224/42.06
[58] Field of Search .............. 224/42.06, 42.21, 42.28, 224/42.26, 42.29

[56] References Cited

U.S. PATENT DOCUMENTS

| | | | |
|---|---|---|---|
| 3,753,520 | 8/1973 | Bodde | 224/42.21 |
| 3,977,713 | 8/1976 | Guin | 224/42.06 |
| 4,434,919 | 3/1984 | Flowers | 224/42.21 |
| 4,484,699 | 11/1984 | Heck | 224/42.21 |
| 4,561,575 | 12/1985 | Jones | 224/42.21 |
| 4,817,834 | 4/1989 | Weiler | 224/42.06 |

FOREIGN PATENT DOCUMENTS 330350 7/1958 Fed. Rep. of Germany ... 224/42.21

*Primary Examiner*—Henry J. Recla
*Assistant Examiner*—Keith Kupferschmid
*Attorney, Agent, or Firm*—Charles J. Prescott; Raymond H. Quist

[57] ABSTRACT

A spare tire support for a vehicle having a horizontally hinged rear closure has an L-shaped swing bracket secured in the space between the right rear light assembly and the upwardly extending internal frame by bolts through the internal frame. Nuts for these bolts are fastened by removing the rear light assembly to expose the access holes therein. The short leg of the swing bracket is below and spaced from the horizontally extending frame member (typically a box frame). A horizontal swing bar has one end mounted in this space on a hinge bolt which extends from the top of the horizontal frame member and through the short leg of the swing bracket. The horizontal swing bar is moveable between a stowed position below the horizontal frame member and an unstowed position clear of the vehicle rear closure. Joined to the horizontal swing bar (as by welding) is a short bar which extends outwardly sufficiently to clear the horizontal frame and rear bumper, if any. An upwardly extending support bar is joined to the short bar and supports the lugs on which the spare tire wheel is mounted.

5 Claims, 2 Drawing Sheets

SPARE TIRE SUPPORT FOR VEHICLE

BACKGROUND OF THE INVENTION

1. Field of the Invention

This invention relates generally to a spare tire support located at the rear of a vehicle, and more particularly to a spare tire support for a vehicle having a horizontally hinged rear door or tailgate.

2. Description of Related Art

Vehicles having vertically hinged rear doors may have a spare tire support mounted on the door. In general, horizontally hinged rear doors or tailgates do not have a spare tire support as the added weight would make the opening or closing difficult. Such vehicles often have a support for the spare tire under the vehicle where it is awkward to remove. The present invention provides a spare tire support which is mounted at the rear of the vehicle, but which is not attached to the door or tailgate.

SUMMARY OF THE INVENTION

A spare tire support is hingedly mounted, preferably at the right side below the rear bumper. The swing bracket through which the hinge bolt passes is secured to a frame member of the vehicle in the space behind the taillight. This space extends down past the box frame which may serve as the bumper, or have a more decorative bumper covering it. The support includes a horizontal swing bar hinged at one end on the hinge bolt which is disposed under the bumper when in the stowed position. A clearance bar extends out at right angles to this horizontal swing bar so as to clear the bumper. An upwardly extending closure (which may be a door or tail gate) conforming bar is configured so that it generally follows the profile of the closure and is close to, but spaced from the closure. All bar members are rigid so that flexure is negligible. Mounting bolts on which the wheel of the spare tire is mounted are secured to a short lateral member at a height which will not cause the spare tire to block rear view vision. The support is moved to its unstowed position by releasing the locking device and swinging the support out and to the side of the vehicle. In this position, the weight of the support tends to keep it to the side where it is fully clear of the door or tailgate. If the vehicle is parked at the right side of the road (as is customary) the right side mounting will keep the support clear of traffic. Access to the interior is therefore unimpeded.

It is therefore an object of this invention to provide a spare tire support at the rear of a vehicle having a horizontally hinged rear door or tailgate.

It is also an object of this invention to provide a spare tire support which is secured to the vehicle without requiring modification of the generally visible external body.

In accordance with these and other objects, which will become apparent hereafter, the instant invention will now be described with reference to the accompanying drawings.

DETAILED DESCRIPTION OF THE INVENTION

Figure 1:
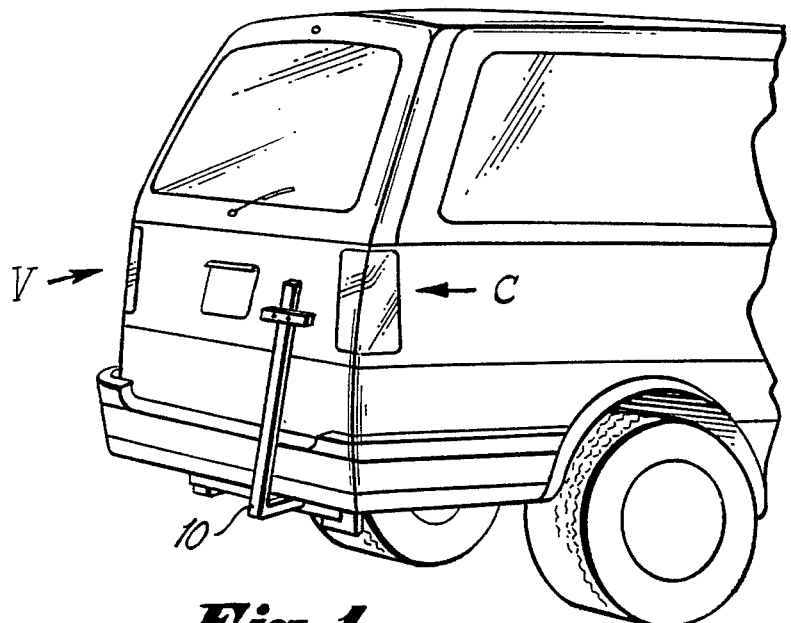
FIG. 1 is a perspective view of a spare tire support in stowed position on a vehicle.
Figure 2:
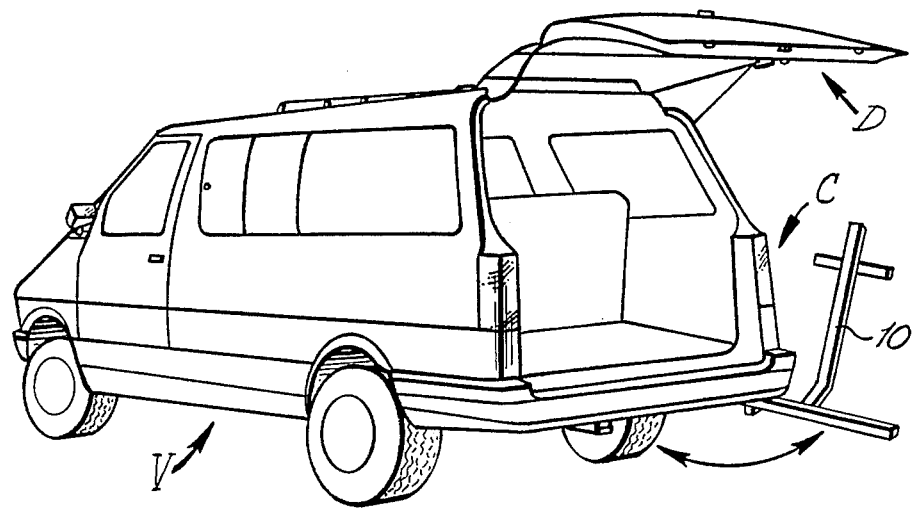
FIG. 2 is a perspective view of a spare tire support in unstowed position on a vehicle with the rear door raised.

Referring to FIG. 1, vehicle V is shown having spare tire support in stowed position thereon. As shown in FIG. 2, vehicle V has rear door D which is horizontally hinged. This necessitates moving spare tire support 10 to an unstowed position clear of door D. Other vehicle have horizontally hinged rear closures. The tail gates of pickup trucks are typically horizontally hinged.

Figure 3:
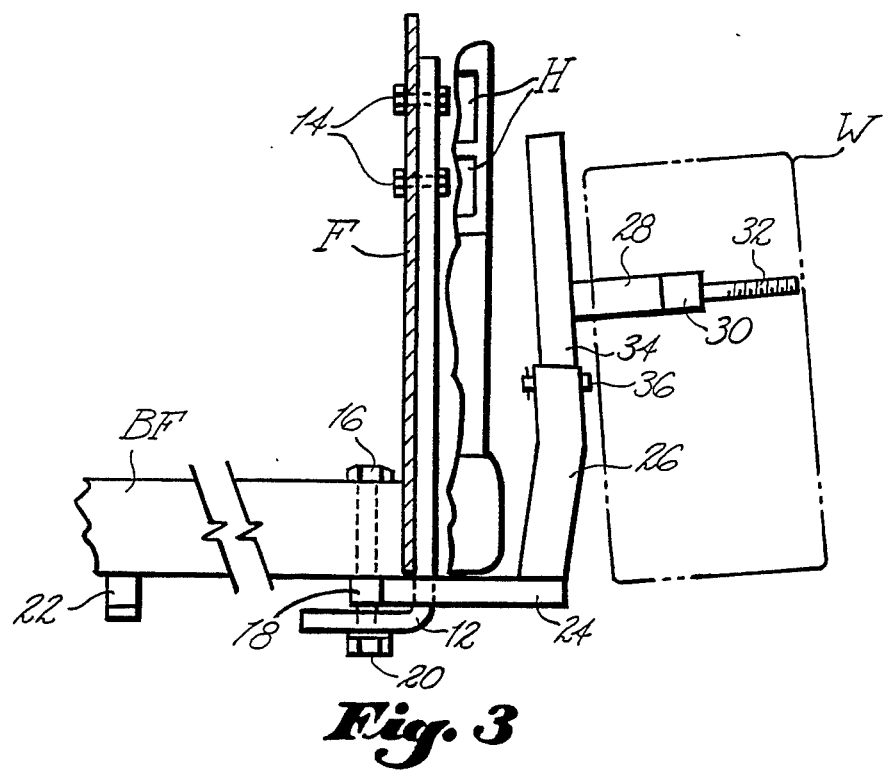
FIG. 3 is a fragmentary view from the rear of the vehicle showing the spare tire support mounting in the unstowed position.
Figure 4:
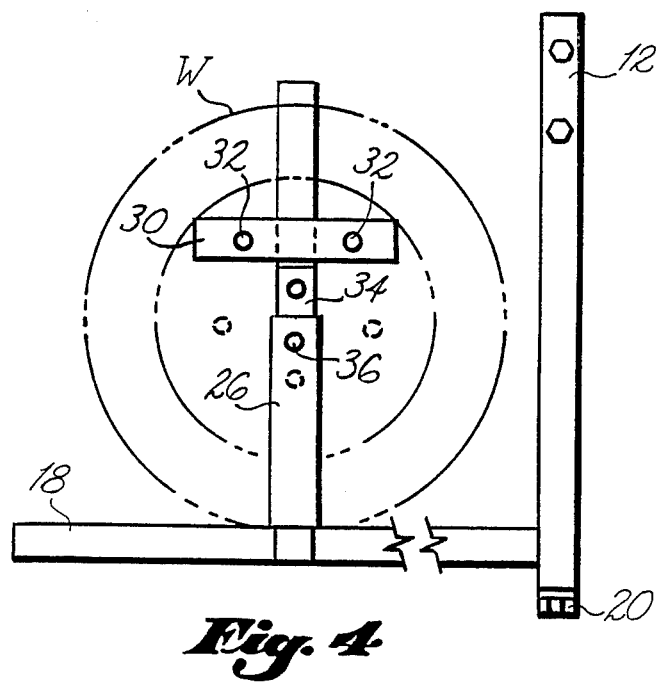
FIG. 4 is a side view of FIG. 3 with the vehicle elements deleted.

Turning next to FIGS. 3 and 4, the spae tire support of this invention is depicted more clearly. L-shaped swing bracket 12 is secured by bolts 14 to vehicle frame member F. Frame member F is an upwardly extending frame member located adjacent to the rear closure. Bolts 14 are located so that nuts can be secured thereon by removing the rear light cluster behind which are located access holes H. In the minivan shown, rear light cluster C is secured by four screws. The long leg of L-shaped swing bracket 12 extends down below vehicle box frame BF. Hinge bolt 16 passes through an existing hole in box frame BF, horizontal swing bar 18 and the short leg of L-shaped swing bracket 12. Nut 20 holds hinge bolt 16 in position. Spring clip 22 receives and holds horizontal swing bar 18 when the spare tire support is in stowed position. Another type of locking device can be substituted for spring clip 22.

As shown in FIG. 3, clearance bar 24 is secured to horizontal swing bar 18 to extend out beyond box frame BF and the bumper, if any, when the spare tire support is in stowed position. Upwardly extending closure conforming bar 26 is secured to the end of clearance bar 24. Closure conforming bar 26 is shaped to conform generally to the rear closure profile so that when the spare tire holder is in the stowed position, it will be spaced from, but close to the vehicle closure. It is necessary in constructing the spare tire support to use material having negligible flexure so that neither the support nor the spare tire will strike the reer closure. A weldment of mild carbon, cold rolled steel has been found suitable. Connected to and extending from closure conforming bar 26 is support arm 28, to which lug support bar 30 is secured. One or more lugs 32 extend from lug support bar 30 on which the wheel for the spare tire is mounted. Shown in phantom is wheel W of a five lug type.

In order to give the spare tire holder of this invention a greater universality, upwardly extending support bar 26 may be made with a telescoping upper part 34 held in place by pin 36 at a desired height. This accommodates not only different vehicles, but also different wheel sizes.

It should be recognized that the precise dimensions of the various parts will change to accommodate different vehicles.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A spare tire support for a vehicle having a horizontally hinged rear closure, a horizontally extending frame member disposed below and spaced from the rear closure, and an upwardly extending frame member adjacent to but spaced from the rear closure said upwardly extending frame member including walls defining a cavity therebetween, access holes in said frame member into the interior of said cavity for mounting a rear light cluster therein, the upwardly extending frame member having a wall portion opposite the vehicle access holes comprising:

an L-shaped swing bracket having a long leg with a top end adapted to be secured adjacent to said opposite wall portion of the upwardly extending frame member through the vehicle access holes after removal of the rear light cluster;

said L-shaped swing bracket having a short leg adapted to be disposed below and spaced from the horizontally extending frame member;

a horizontal swing bar having one end disposed between said swing bracket short leg and the horizontally extending frame member;

a hinge bolt extending through said short leg of said L-shaped swing bracket, said one end of said horizontal swing bar, and the horizontally extending frame member adapted to receive said hinge bolt;

whereby said horizontal swing bar is adapted to be moved between a stowed position below the horizontal frame member and an unstowed position at least orthogonal to the horizontal frame member;

a clearance bar secured to said horizontal swing bar and extending orthogonally therefrom;

an upwardly extending support bar secured to said clearance bar a distance from said horizontal swing bar sufficient to permit said horizontal swing bar to be placed in said stowed position;

a lug support bar, having at least one wheel mounting lug secured thereto, secured to said upwardly extending support bar.

2. A spare tire support for a vehicle in accordance with claim 1 further including:

a support arm disposed between said upwardly extending support bar and said lug support bar, whereby said lug support bar is displaced from said upwardly extending support bar.

3. A spare tire support for a vehicle in accordance with claim 1 wherein:

said upwardly extending support bar is configured to conform to the rear closure configuration and is spaced therefrom.

4. A spare tire support for a vehicle in accordance with claim 1 further including:

a horizontal swing bar stowed position lock secured to the horizontally extending frame member.

5. A spare tire support for a vehicle in accordance with claim 1 wherein:

said upwardly extending support bar is adjustable in length.

* * * * *